United States Patent
Yoshii et al.

(10) Patent No.: US 6,947,107 B2
(45) Date of Patent: Sep. 20, 2005

(54) REFLECTOR WHICH APPEARS BRIGHT WHEN VIEWED AT SPECIFIC ANGLE AND REFLECTIVE LIQUID CRYSTAL DISPLAY

(75) Inventors: Katsumasa Yoshii, Fukushima-ken (JP); Tatsuya Moriike, Fukushima-ken (JP); Kinji Omote, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 388 days.

(21) Appl. No.: 10/180,577

(22) Filed: Jun. 26, 2002

(65) Prior Publication Data

US 2003/0001995 A1 Jan. 2, 2003

(30) Foreign Application Priority Data

Jun. 28, 2001 (JP) .......................................... 2001-197360

(51) Int. Cl.[7] ............................................. G02F 1/1335
(52) U.S. Cl. ......................... 349/113; 349/114; 349/61; 349/67; 349/122
(58) Field of Search ................................ 349/113, 106, 349/122, 42, 43, 114, 61, 67

(56) References Cited

U.S. PATENT DOCUMENTS

| | | | | |
|---|---|---|---|---|
| 5,101,279 A | * | 3/1992 | Kurematsu et al. | 349/95 |
| 5,128,787 A | * | 7/1992 | Blonder | 349/113 |
| 5,841,496 A | | 11/1998 | Itoh et al. | |
| 6,097,458 A | | 8/2000 | Tsuda et al. | |
| 6,163,405 A | * | 12/2000 | Chang et al. | 359/599 |
| 6,199,992 B1 | | 3/2001 | Tanada | |
| 6,219,119 B1 | | 4/2001 | Nakai | |
| 6,219,120 B1 | | 4/2001 | Sasaki et al. | |
| 6,429,919 B1 | * | 8/2002 | Takatsuka et al. | 349/113 |
| 6,509,943 B2 | * | 1/2003 | Baek et al. | 349/113 |
| 6,606,139 B2 | * | 8/2003 | Yoshii et al. | 349/114 |
| 6,750,930 B2 | * | 6/2004 | Yoshii et al. | 349/113 |

FOREIGN PATENT DOCUMENTS

| | | |
|---|---|---|
| EP | 0 965 863 | 12/1999 |
| EP | 1 174 735 A2 | 1/2002 |
| JP | 10312165 | 11/1998 |
| JP | 11326612 | 3/1999 |
| JP | 11242105 | 9/1999 |

OTHER PUBLICATIONS

Search Report dated Aug. 5, 2004 for European Patent Application No. EP 02 25 2646.

* cited by examiner

*Primary Examiner*—Ahshik Kim
(74) *Attorney, Agent, or Firm*—Brinks Hofer Gilson & Lione

(57) ABSTRACT

A reflector for a liquid crystal display includes a substrate with light-reflective concave portions on the surface thereof. Each concave portion has a specific vertical section which passes through a deepest point of the concave portion. The internal shape of the specific vertical section is defined by a first curve, which extends from one point on the peripheral edge of the concave portion to the deepest point of the concave portion, and a second curve, which extends continuously from the first curve and from the deepest point of the concave portion to another point on the peripheral edge of the concave portion. The average of the absolute value of an inclination angle of the first curve relative to the substrate surface is larger than the average of the absolute value of an inclination angle of the second curve relative to the substrate surface.

71 Claims, 7 Drawing Sheets

REFLECTOR WHICH APPEARS BRIGHT WHEN VIEWED AT SPECIFIC ANGLE AND REFLECTIVE LIQUID CRYSTAL DISPLAY

This application claims the benefit of priority to Japanese Patent Application 2001-197360, filed on Jun. 28, 2001.

BACKGROUND OF THE INVENTION

1. Field of the Invention

The present invention relates to reflectors and reflective liquid crystal displays, and more specifically relates to a reflector having reflection characteristics such that it appears brighter when reflection light is observed at a specific viewing angle than when it is observed at other viewing angles, and to a reflective liquid crystal display using the reflector.

2. Description of the Related Art

Liquid crystal displays can be generally classified into two types: transmissive liquid crystal displays and reflective liquid crystal displays. In reflective liquid crystal displays, external light is used for illumination and a front light is used for ensuring visibility. Reflective liquid crystal displays are commonly used as display units for electronic devices such as mobile computers, calculators, digital watches, communication equipment, game machines, measuring devices, electronic display boards, etc.

An example of a reflective liquid crystal display is shown in FIG. 8. With reference to FIG. 8, a display-side substrate 20 and a reflector-side substrate 10 oppose each other with a liquid crystal layer 30 therebetween. The display-side substrate 20 is transmissive and the reflector-side substrate 10 is reflective. The external surface of the display-side substrate 20 serves as a display surface, and the reflector-side substrate 10 is provided with a reflective layer 12. In this reflective liquid crystal display, external light incident on the display surface passes through the display-side substrate 20 and the liquid crystal layer 30, is reflected by the reflective layer 12 in the reflector-side substrate 10, passes through the liquid crystal layer 30 again, and is emitted from the display surface, thereby making an image visible.

In FIG. 8, the reflector-side substrate 10 is formed by laminating a glass substrate 11, the reflective layer 12, an intervening layer 13, a color-filter layer 14, a planarizing layer 15, a transparent electrode layer 16 formed of an Indium Tin Oxide (ITO) film, a Nesa film, etc., and an alignment layer 17, in that order from the bottom. In addition, the display-side substrate 20, which opposes the reflector-side substrate 10 across the liquid crystal layer 30, is formed by laminating an alignment layer 21, an insulating layer 22, a transparent electrode layer 23 formed of an ITO film, a Nesa film, etc., a glass substrate 24, and a light-modulating layer 25 (a polarizing plate, a retardation plate, etc.) in that order from the liquid crystal layer 30.

In the above-described liquid crystal display, the color-filter layer 14 in the reflector-side substrate 10 includes red (R), green (G), and blue (B) color films which are sequentially arranged in parallel to each other in a striped pattern, and the transparent electrode layer 16 includes transparent electrodes disposed in parallel to each other in a striped pattern at positions corresponding to the color films. In addition, the transparent electrode layer 23 in the display-side substrate 20 includes transparent electrodes which are arranged in parallel to each other and perpendicularly to the transparent electrodes of the transparent electrode layer 16. Parts of the liquid crystal layer 30 at intersections of the transparent electrodes of the transparent electrode layer 23, which is disposed at the display-side, and the transparent electrodes of the transparent electrode layer 16, which is disposed at the reflector-side, are formed as pixels, each pixel corresponding to one of the colors.

In addition, in the above-described liquid crystal display, a front light (not shown) is disposed outside the display-side substrate 20 as required. In such a case, similarly to external light, light emitted from the front light passes through the display-side substrate 20 and the liquid crystal layer 30, is reflected by the reflective layer 12 in the reflector-side substrate 10, passes through the liquid crystal layer 30 again, and is emitted from the display surface.

The reflective layer 12 in the reflector-side substrate 10 can be generally classified into the specular-reflection type and the diffuse-reflection type. FIG. 9A shows a specular-reflection type reflective layer 12' and the reflective surface of this reflective layer 12' is made flat so that the absolute value of the incidence angle and the absolute value of the emission angle with respect to the normal of the display surface are the same. Accordingly, when the display surface is observed, there are problems in that the brightness of the display surface varies depending on the positional relationship between the light source and the viewpoint and visibility is degraded due to back reflection, that is, reflection of the light source, the observer's face, etc., in the display surface. In order to solve such problems, in a diffuse-reflection type reflective layer 12" shown in FIGS. 9B and 10, a plurality of small concavities and convexities (concave portions 31 in FIG. 10) are irregularly formed next to each other on the reflective surface of the reflective layer 12". Thus, in the diffuse-reflection type reflective layer 12", external light incident at a certain angle is diffusely reflected by the surface of the reflective layer 12". Accordingly, it is possible to obtain a reflective liquid crystal display having a wide viewing angle in which brightness does not vary even when the viewpoint is moved and back reflection is reduced.

With regard to the material of the diffuse-reflection type reflective layer 12", the shape and distribution of the concavities and convexities, and the method for forming the concavities and convexities, various suggestions have been made from the viewpoints of reflection characteristics and productivity.

Regarding the method for forming the concavities and convexities, a method is known in which light is radiated on the surface of a plate-shaped resin substrate formed of a photosensitive resin layer, etc. through a pattern mask, and a plurality of small, spherical concave portions 31 are formed next to each other by a development process. In order to obtain a mirror-finished surface, a layer of aluminum, silver, etc. is formed on the surface on which the concave portions are formed by vapor deposition or plating. In addition, another method is also known in which a plurality of small, spherical concave portions 31 are formed next to each other by pressing a punch (stamping tool) having a hemispherical end portion against the surface of a flat substrate such as an aluminum plate, a silver plate, etc.

The concave portions 31 are generally formed in a spherical shape whose depth varies in the range of 0.1 $\mu$m to 3 $\mu$m, and distances between the concave portions 31 are set such that the pitch between the concave portions 31 (distance between the central points of the concave portions 31) varies in the range of 5 to 50 $\mu$m.

An example of a desk calculator is shown in FIG. 11A, and an example of a mobile computer is shown in FIG. 11B. As shown in FIGS. 11A and 11B, when an observer actually views the display surface of a liquid crystal display, he or she often looks up at the display surface from the lower side thereof. More specifically, the viewpoint Ob of the observer is inclined toward the lower side of the display surface by an angle θ relative to the normal X perpendicular to the display surface.

On the other hand, in reflective liquid crystal displays, external light is used for illumination; however, the intensity of the external light is greatly reduced as it passes through the light-modulating layer 25 formed of a polarizing plate, etc., the two transparent electrode layers 16 and 23, the liquid crystal layer 30, the color-filter layer 14, etc., and returns. In addition, when the diffuse-reflection type reflective layer 12" is used, incident light is widely diffused, so that the display surface appears substantially dark when viewed from the viewpoint Ob. Accordingly, when the intensity of external light is small, the visibility is substantially reduced. In the reflective liquid crystal display of the known art, the shape and arrangement of the concave portions are determined such that variations in brightness caused by the difference in viewing angle are made as small as possible. Thus, there is a problem in that sufficient brightness cannot be obtained when the display surface is observed in a specific viewing-angle range, for example, from the lower side relative to the normal of the display surface. In addition, also in the case in which a front light is used, there are problems in that the intensity of the light is reduced and incident light is diffused as in the case of external light. Accordingly, it has been difficult to ensure sufficient brightness in a specific viewing-angle range without increasing the consumption of electrical power for illumination more than necessary.

Accordingly, reflective liquid crystal displays in which the display surface appears especially bright when viewed in a specific viewing-angle range and back reflection is suppressed over a wide viewing-angle range, have been required.

SUMMARY OF THE INVENTION

In order to solve the above-described problems, an object of the present invention is to provide a reflector which appears especially bright when viewed in a specific viewing-angle range and has a light-diffusing characteristic so that back reflection is suppressed over a wide viewing-angle range. In addition, it is also an object of the present invention to provide a reflective liquid crystal display using the reflector. It is also an object of the present invention to provide a reflector which appears brighter than a conventional reflector when viewed in a viewing-angle range that is typically used in a device housing the reflector, more particularly a liquid crystal display or electronic device containing the liquid crystal display.

In order to solve the above-described problems, the present invention provides a reflector including a substrate having a plurality of light-reflective concave portions on the surface thereof, each concave portion having a specific vertical section which passes through a deepest point of the concave portion. The internal shape of the specific vertical section is defined by a first curve and a second curve, the first curve extending from a first point on the peripheral edge of the concave portion to the deepest point of the concave portion, and the second curve extending continuously from the first curve and from the deepest point of the concave portion to a second point on the peripheral edge of the concave portion. In addition, the average of the absolute value of an inclination angle of the first curve relative to the substrate surface is larger than the average of the absolute value of an inclination angle of the second curve relative to the substrate surface.

As described above, in the reflector of the present invention, a plurality of light-reflective concave portions are formed on the substrate surface, and each of the concave portions has a curved surface (concave surface). Accordingly, the reflector appears bright from a wide viewing area and has a light-diffusing characteristic so that back reflection is suppressed.

The internal shape of each concave portion along the specific vertical section is defined by the first curve and the second curve, which are connected to each other at the deepest point. The first and the second curves are formed such that the average of the absolute value of the inclination angle of the first curve relative to the substrate surface is larger than the average of the absolute value of the inclination angle of the second curve relative to the substrate surface. More specifically, the inclination of the first curve is relatively steep and the inclination of the second curve is relatively gentle, and the second curve is longer than the first curve.

Accordingly, the amount of light reflected by the surface at regions around the second curve is larger than the amount of light reflected by the surface at regions around the first curve. More specifically, luminous flux density of reflection light in the direction of specular reflection relative to the surface at regions around the second curve is increased. Accordingly, when the first curves in each concave portion are aligned in a specific direction (or in a plurality of specific directions), reflectance in the specific direction(s) can be increased over the entire region of the reflector.

According to the present invention, the concave portions are preferably formed such that the specific vertical sections of each concave portion are aligned in the same direction and the orientations of the first curves in the concave portions are the same. In such a case, reflectance in the direction in which light is reflected by the surface at regions around the second curve is increased over the entire region of the reflector. Accordingly, reflection characteristics in which reflection light is moderately condensed in a specific direction can be obtained.

In addition, according to the present invention, the inclination angle of the first curve relative to the substrate surface and the inclination angle of the second curve relative to the substrate surface are preferably zero at the point at which the first curve and the second curve are connected to each other. In addition, preferably, when the inclination angle of the first curve is negative and the inclination angle of the second curve is positive, the inclination angle of the first curve is gradually increased from a negative value and the inclination angle of the second curve is gradually reduced from a positive value, and both the inclination angles of the first and second curves become substantially zero at the point at which the first and second curves are connected to each other.

Accordingly, the internal surfaces of each concave portion can be made smooth over the entire regions thereof, and reflectance in the direction of specular reflection can be prevented from being reduced.

The maximum value of the absolute value of the inclination angle of the first curve relative to the substrate surface is preferably in the range of about 2° to 90°, and more preferably, at least a majority in the range of about 4° to 35°.

Although the maximum inclination angle is preferably determined in accordance with the angle at which an observer views the display surface of the liquid crystal display, it is preferably set in the range of about 2° to 90°. When the maximum inclination angle exceeds 90°, a part of reflection light exceeds the pixel frame of the reflective liquid crystal display and the display surface appears dark. When the maximum inclination angle is smaller than about 2°, the effect of condensing the reflection light in a specific viewing angle becomes insufficient and desired brightness cannot be obtained at a specific viewing angle. In the case in which the present invention is applied to electronic devices such as desk calculators and mobile computers, the maximum inclination angle (of at least a majority of the concave portions) is preferably set in the range of about 4° to 35° in consideration of the viewing angle at which an observer normally views the display surface of the liquid crystal display.

Preferably, the concave portions are irregularly formed such that the depth thereof varies in the range of about 0.1 $\mu$m to 3 $\mu$m.

When the depths of the concave portions are less than about 0.1 $\mu$m, sufficient light-diffusing effect cannot be obtained. When the depths of the concave portions exceed about 3 $\mu$m, the thickness of the substrate, which must be larger than the depths of the concave portions, becomes too large, and disadvantages occur from the viewpoint of manufacturing processes and product quality. When the concave portions have various depths, a moiré-pattern, which often appears due to light interference when the concave portions are formed regularly is less likely to be formed and even more unlikely if the concave portions are irregularly arranged next to each other. In addition, the reflection light is prevented from being converged too sharply at a predetermined viewing angle and the amount of reflection light smoothly varies in the viewing area.

Preferably, the concave portions are irregularly arranged next to each other.

When the concave portions are formed separately, regions at which specular reflection occurs are increased since the regions between the concave portions are flat, and sufficient light-diffusing effect cannot be obtained in the limited pixel area. Accordingly, the concave portions are preferably formed next to each other. In addition, the concave portions are preferably formed irregularly since the moiré-pattern appears when the concave portions are formed regularly.

The present invention also provides a reflective liquid crystal display which includes one of the above-described reflectors. Preferably, the concave portions are formed such that the specific vertical sections of each concave portion are aligned in the same direction and the orientations of the first curves in the concave portions are the same, and the reflector is installed such that the first curves are disposed above the second curves in the concave portions when viewed by an observer.

When the first curves are disposed above the second curves in the concave portions when viewed by the observer, external light, which is mainly incident from the upper side, can be reflected in the direction shifted toward the normal of the substrate surface from the lower side of the observer. This is to say that the angle of reflected light is more proximate to the normal of the surface than the angle of specular reflection.

In addition, -since external light, which is mainly incident from the upper side of the observer, is efficiently received at regions around the second curves, the amount of reflection light is increased over the entire region.

Accordingly, the amount of light reflected toward the eyes of the observer is increased, and a reflective liquid crystal display which appears bright from the viewpoint of the observer can be obtained.

The present invention also provides a reflector in which an integrated value of reflectance in a reflection-angle range smaller than a specular reflection angle with respect to the substrate surface is different from an integrated value of reflectance in a reflection-angle range larger than the specular reflection angle.

Accordingly, when a normal viewing angle of the observer is displaced from the direction of specular reflection relative to the substrate surface, a reflector in which light is mainly reflected in the direction of the normal viewing angle can be obtained.

The present invention also provides a reflective liquid crystal display which includes a reflector in which an integrated value of reflectance in a reflection-angle range smaller than a specular reflection angle with respect to the substrate surface is different from an integrated value of reflectance in a reflection-angle range larger than the specular reflection angle. The reflector is installed such that the reflection-angle range corresponding to the larger of the integrated values of reflectance is disposed at the upper side of the specular reflection angle with respect to the substrate surface when viewed by an observer.

According to the present invention, external light, which is mainly incident from the upper side, can be reflected in the direction shifted toward the normal of the substrate surface from the lower side of the observer.

Accordingly, when the reflective liquid crystal display of the present invention is used as a display for a mobile phone or a notebook computer, the amount of light reflected toward the eyes of the observer is increased, and a reflective liquid crystal display which appears bright from the viewpoint of the observer can be obtained.

As described above, according to the present invention, a reflector can be obtained which has a light-diffusing characteristic so that incident light is diffusely reflected and back reflection is suppressed over a wide viewing angle, and in which the amount of reflection light in the viewing-angle range in which the observer normally views the display is increased. This is to say that while incident light is diffusely reflected by the reflector, i.e. the incident light is reflected over a wide range of angles dependent on the incident angle of the light and the location that the incident light strikes the reflector (the angle of the surface upon which the light is incident), there is a specific concentration of reflected light in the angular range in which an observer normally views the display in addition to decreasing the amount of back reflection from the surface (i.e. reflection of the incident light back along, or near, the angle of incidence). The specific concentration of reflected light or, equivalently, preferred angular range (i.e. angular range in which the incident light is preferentially reflected) is from about the normal to the surface of the reflector to about the specular reflection angle of the particular incident light.

In addition, in a reflective liquid crystal display containing the reflector of the present invention, display surface appears especially bright when viewed in a specific viewing-angle range so that visibility is improved, and back reflection is suppressed over a wide viewing-angle range.

BRIEF DESCRIPTION OF THE DRAWINGS

FIG. 11A shows a case in which a desk calculator is viewed and FIG. 11B shows a case in which a mobile computer is viewed.

DESCRIPTION OF THE PREFERRED EMBODIMENT

An embodiment of the present invention will be described below with reference to the accompanying drawings; however, it is not intended to limit the scope of the present invention.

Figure 1:
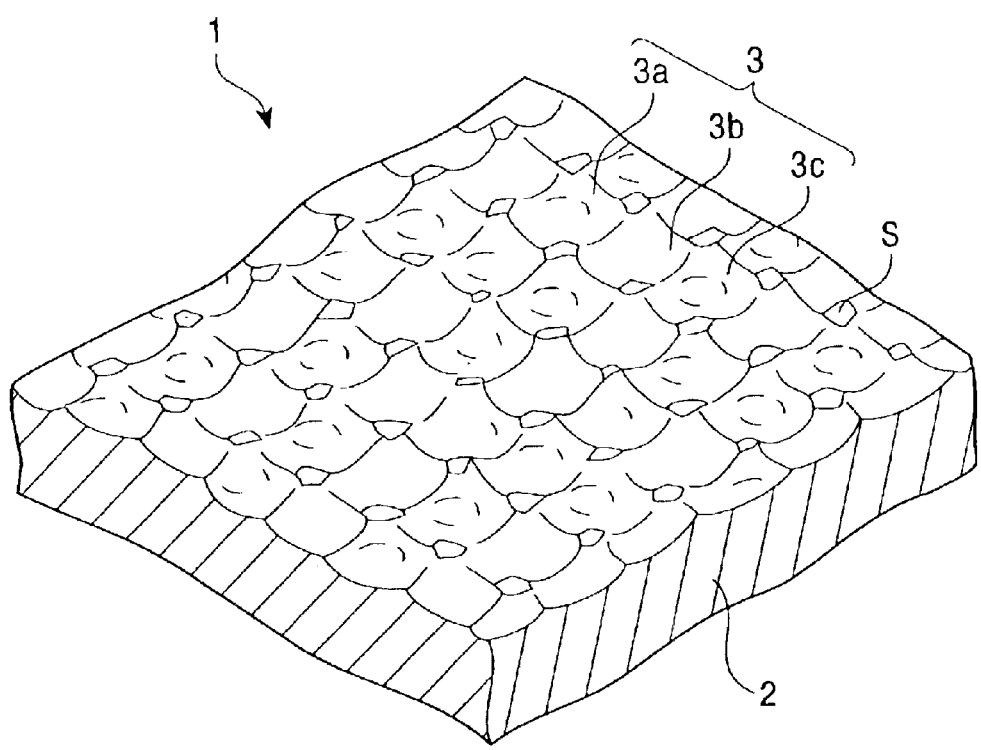
FIG. 1 is a perspective view of a reflector according to an embodiment of the present invention.

FIG. 1 is a diagram showing a reflector 1 according to an embodiment of the present invention. As shown in FIG. 1, the reflector 1 of the present embodiment is constructed of a plate-shaped substrate 2 formed of, for example, aluminum. A plurality of light-reflective concave portions 3a, 3b, 3c, . . . , (denoted as concave portions 3 when they are generically described) are irregularly formed next to each other on the surface S (standard surface) of the substrate 2.

Figure 2:
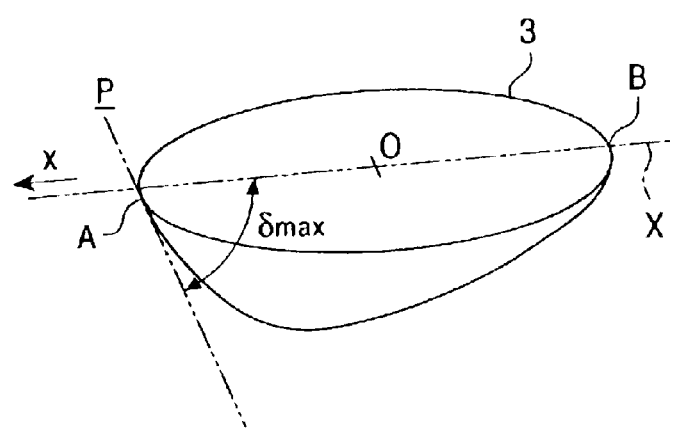
FIG. 2 is a perspective view of a concave portion according to the embodiment.
Figure 3:
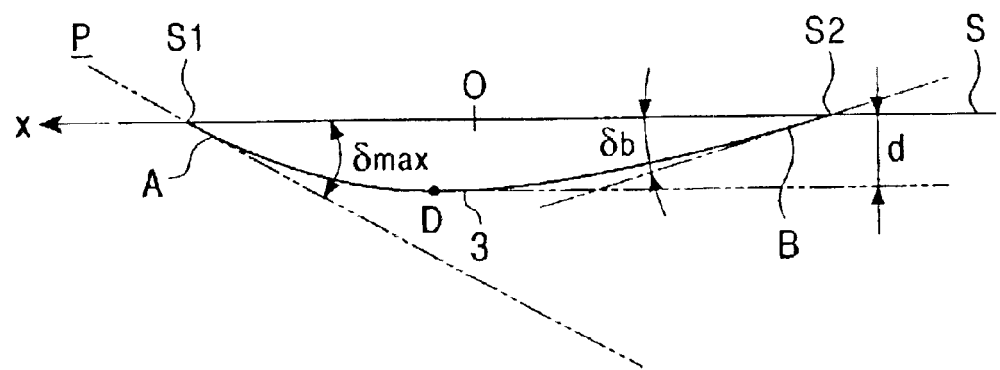
FIG. 3 is a sectional view of the concave portion along a specific vertical section.

FIG. 2 and FIG. 3 are a perspective view and a sectional view, respectively, of the concave portion 3. As shown in FIGS. 2 and 3, the internal shape of the concave portion 3 along a specific vertical section X is defined by a first curve A and a second curve B, the first curve A extending from one point S1 on the peripheral edge to the deepest point D, and the second curve B extending continuously from the first curve A from the deepest point D to the other point S2 on the peripheral edge. Both an inclination angle of the first curve A relative to the substrate surface S and an inclination angle of the second curve B relative to the substrate surface S become substantially zero at the deepest point D, where the first curve A and the second curve B are connected to each other. Mathematically, this may be described as the derivative of the concavity going to substantially zero at the deepest point D.

The inclination angle of the first curve A relative to the substrate surface S is steeper than the inclination angle of the second curve B, and the deepest point D is at a position shifted toward the x direction from the central point O of the concave portion 3 (i.e. to the left in FIG. 3). More specifically, the average of the absolute value of the inclination angle of the first curve A relative to the substrate surface S is larger than the average of the absolute value of the inclination angle of the second curve B relative to the substrate surface S. The average of the absolute value of the inclination angle of the first curve A relative to the substrate surface S in the concave portions 3a, 3b, 3c, . . . , varies in the range of about 1° to 89° (i.e. from almost parallel to almost perpendicular to the surface). In addition, the average of the absolute value of the inclination angle of the second curve B relative to the substrate surface S in the concave portions 3a, 3b, 3c, varies in the range of about 0.5° to 88° (again from almost parallel to almost perpendicular to the surface, but less than that of the first curve A).

Since the inclination angles of the first curve A and the second curve B change gradually, the maximum inclination angle $\delta_{max}$ (absolute value) of the first curve A is larger than the maximum inclination angle $\delta_b$ (absolute value) of the second curve B. In addition, the inclination angles of the first curve A and the second curve B relative to the substrate surface S both become zero at the deepest point D, where the first curve A and the second curve B are connected to each other. Accordingly, the first curve A, whose inclination angle is negative relative to the drawing, and the second curve B, whose inclination angle is positive, are smoothly connected to each other.

In the reflector 1 of the present embodiment, the maximum inclination $\delta_{max}$ of the concave portions 3a, 3b, 3c, . . . , varies in the range of about 2° to 90°. However, in a majority of the concave portions, the maximum inclination $\delta_{max}$ of the concave portions 3a, 3b, 3c, . . . , varies in the range of about 4° to 35°. This is to say that the majority of the concave portions 3a, 3b, 3c have maximum inclinations $\delta_{max}$ that are concentrated in a particular angular range within the larger overall angular range of maximum inclinations $\delta_{max}$ but the maximum inclinations $\delta_{max}$ of these concave portions 3a, 3b, 3c may be randomly or otherwise distributed within that particular angular range.

In addition, each of the concave portions 3 has a single deepest point D (a point at which the inclination angle is zero). The distance between the deepest point D and the substrate surface S is defined as the depth of each concave portion 3, and the depth of the concave portions 3a, 3b, 3c, . . . , varies in the range of about 0.1 $\mu$m to 3 $\mu$m.

In the present embodiment, the specific vertical sections X of each of the concave portions 3a, 3b, 3c, . . . , are aligned in the same direction. In addition, the orientations of the first curves A in each of the concave portions 3a, 3b, 3c, . . . , are the same. In other words, in every concave portion, the x axis shown in FIGS. 2 and 3 extends in the same direction.

Note that although the term "each of the concave portions" is used in multiple places throughout the detailed description, a substantial majority of the concave portions may be used as well as every concave portion. As long as the effects described herein are achieved, the absolute percentage of concave portions which are, for example, oriented in exactly the same direction is inconsequential.

In the reflector 1 of the present embodiment, the orientations of the first curves A in each of the concave portions 3a, 3b, 3c, . . . , are the same. Accordingly, as shown in FIG. 4, the reflection characteristics of the reflector 1 are made such that the reflection direction is shifted from the direction of specular reflection relative to the substrate surface S.

Figure 4:
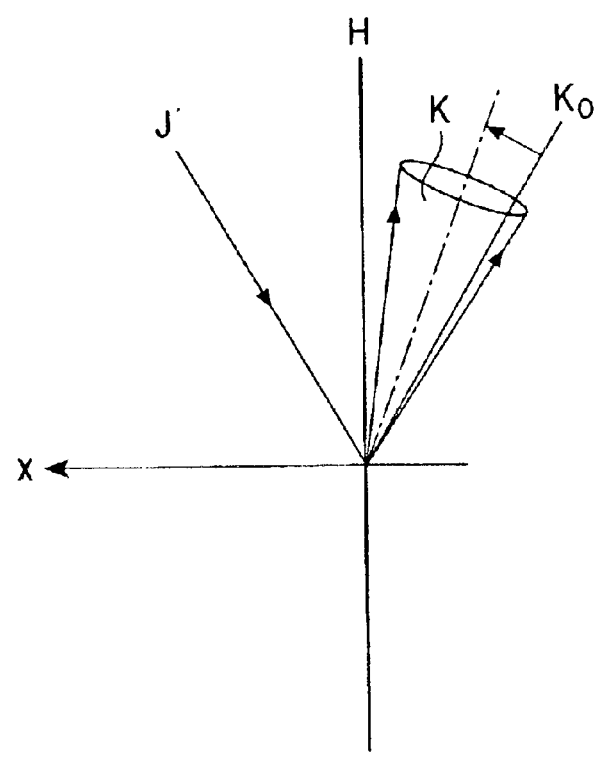
FIG. 4 is a diagram showing the reflection characteristics of a reflector according to the embodiment;.

More specifically, as shown in FIG. 4, the center of the cone of reflection light K corresponding to incident light J, which is incident at an angle from the upper side of the x direction, is shifted such that a viewing area from which the display appears bright is shifted from the direction of specular reflection $K_0$ toward the normal H of the substrate surface S. The incident light J and specular reflection $K_0$ are, as above, symmetric around the normal H of the substrate surface S. Note that what is meant by a direction with respect to the surface (e.g. normal to the surface) is a direction with respect to a similar surface that is flat, thereby disregarding directions formed by the minute irregularities (e.g. relatively microscopic crevasses or projections) present in almost every physical layer. Other examples of such a flat surface are the surface of the reflector in which the concave portions are non-existent or are completely filled in, thereby forming the normal as shown in FIG. 4(H).

As a result, the overall reflection characteristics in the specific vertical section X are made such that reflectance in the direction in which light is reflected by the surface at regions around the second curve B is increased. Accordingly, reflection characteristics in which reflection light is moderately condensed in a specific direction can be obtained.

Figure 5:
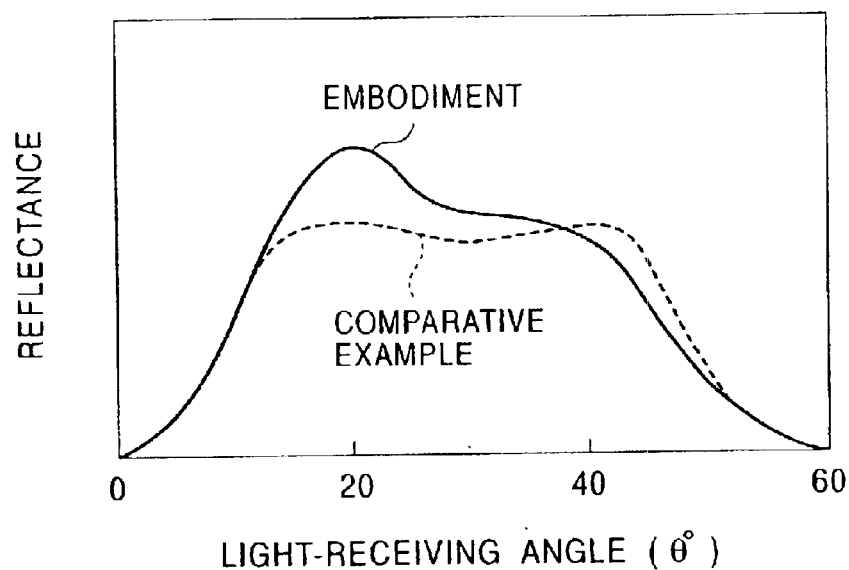
FIG. 5 is a graph showing the relationship between a light-receiving angle and reflectance.

FIG. 5 shows the relationship between the light-receiving angle (θ°) and brightness (reflectance) in the case in which external light is radiated onto the display surface of the reflector 1 of the present embodiment under a condition in which the incidence angle is 30°. The light-receiving angle is changed from 0° (angle corresponding to the normal) to 60° across the midpoint 30°, which is the specular reflection angle relative to the display surface (substrate surface). As a comparative example, the relationship between the light-receiving angle and the reflectance in a reflective liquid crystal display containing a known reflector having spherical concave portions is also shown in FIG. 5.

As is apparent from FIG. 5, in the comparative example (shown by the dashed line), the reflectance is approximately constant when the light-receiving angle is in the range of 15° to 45°. In contrast, with respect to the reflector 1 of the present embodiment (shown by the solid line), the integrated value of the reflectance in the range in which the light-receiving angle is smaller than the specular reflection angle (30°) is larger than the integrated value of the reflectance in the range in which the light-receiving is larger than the specular reflection angle. Typically, as users tend to view the liquid crystal display from angles of about normal to the surface to about 35° from normal, this is also the overall angular range that the liquid crystal display should have increased brightness relative to a conventional liquid crystal display. More specifically, sufficient brightness can be obtained at viewing angles around 20°. This is to say that a particular example of an angle at which an observer typically uses to view the liquid crystal display is around 20° and thus the peak in the brightness of the liquid crystal display is also approximately this angle.

Although the manufacturing method for the reflector 1 is not limited, the reflector 1 can be manufactured by, for example, the following processes.

First, a punch (stamping tool) having a convex end portion corresponding to the shape of the above-described convex portions is prepared. The punch is held such that the end portion thereof opposes an aluminum substrate, and is repeatedly pressed against the aluminum substrate so as to form the convex portions over the entire area of a predetermined region of the aluminum substrate. While the punch is repeatedly pressed against the aluminum substrate, the orientation of the punch relative to the aluminum substrate is maintained constant and the stroke and interval are changed irregularly. The stroke is adjusted such that the depth of the concave portion is in a predetermined range, and the interval is adjusted such that a moire-pattern does not appear.

Figure 6:
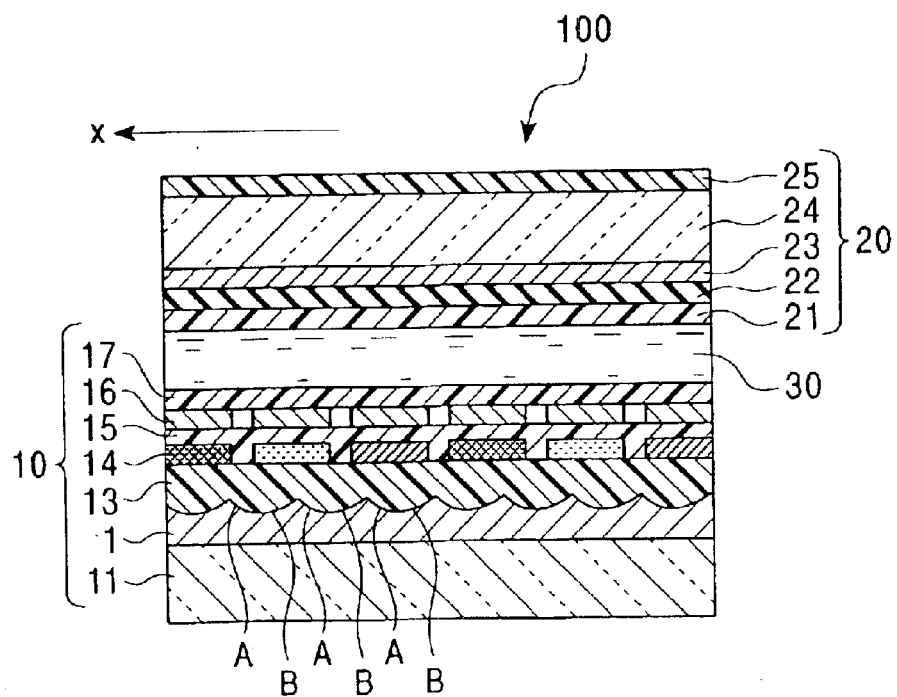
FIG. 6 is a sectional view showing the layer structure of the reflective liquid crystal display according to the embodiment.

FIG. 6 is a sectional view showing the layer structure of a reflective liquid crystal display 100 containing the reflector 1 of the present embodiment.

With reference to FIG. 6, in the reflective liquid crystal display 100, a display-side substrate 20 and a reflector-side substrate 10 oppose each other with a liquid crystal layer 30 therebetween. The display-side substrate 20 is transmissive and the reflector-side substrate 10 is reflective. The external surface of the display-side substrate 20 serves as a display surface, and the reflector-side substrate 10 is provided with the reflector 1.

The reflector-side substrate 10 is formed by laminating a glass substrate 11, the reflector 1, a transparent intervening layer 13, a color-filter layer 14, a transparent planarizing layer 15, a transparent electrode layer 16 formed of an Indium Tin Oxide (ITO) film, a Nesa film, etc., and an alignment layer 17, in that order from the bottom. In addition, the display-side substrate 20, which opposes the reflector-side substrate 10 across the liquid crystal layer 30, is formed by laminating an alignment layer 21, an insulating layer 22, a transparent electrode layer 23 formed of an ITO film, a Nesa film, etc., a glass substrate 24, and a light-modulating layer 25 (a polarizing plate, a retardation plate, etc.) in that order from the liquid crystal layer 30.

Transparent electrodes of the transparent electrode layer 16 and transparent electrodes of the transparent electrode layer 23 are arranged in striped patterns which perpendicularly cross each other, the liquid crystal layer 30 being disposed therebetween. Thus, a simple-matrix liquid crystal device is formed in which pixels are formed at intersections of the transparent electrodes of the transparent electrode layer 16 and the transparent electrodes of the transparent electrode layer 23. Of course, the transparent electrodes may be formed in other patterns and provided at different locations in the liquid crystal display 100, as can the color filters in the color-filter layer 14. For example, the color filters may be provided in the display-side substrate 20 rather than the reflector-side substrate 10 (for instance, formed on the substrate 24 and having another insulating layer disposed the transparent electrode layer 23 and the color filter). Examples of possible arrangements of the color filters include a stripe-type arrangement having different colors arranged successively side by side, a delta-type arrangement having colors arranged in a triangular shape, and a mosaic-type arrangement having arranged successively side by side in a vertical direction and a horizontal direction. In addition, the color filters may comprise different colors (red, blue, green, cyan, magenta, yellow or achromatic to name a few).

In the reflective liquid crystal display 100, the reflector 1 is aligned such that the first curves A in the concave portions 3a, 3b, 3c, . . . , are placed in the x direction relative to the second curves B, which have gentler slopes. In addition, characters, etc., are displayed in the orientation such that the x direction is aligned with the upward direction.

Figure 7:
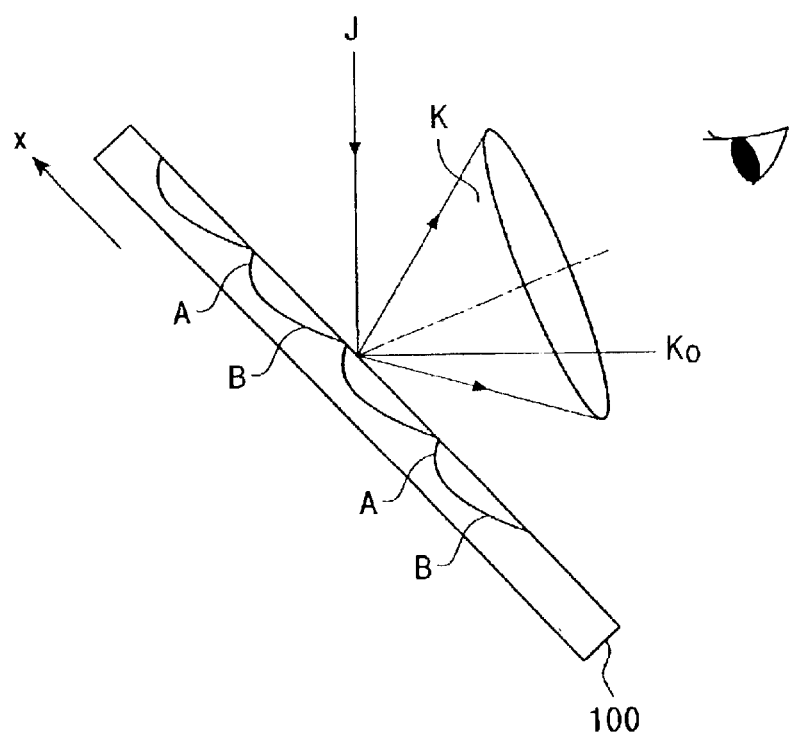
FIG. 7 is a diagram showing a manner in which the reflective liquid crystal display according to the embodiment is used.
Figure 8:
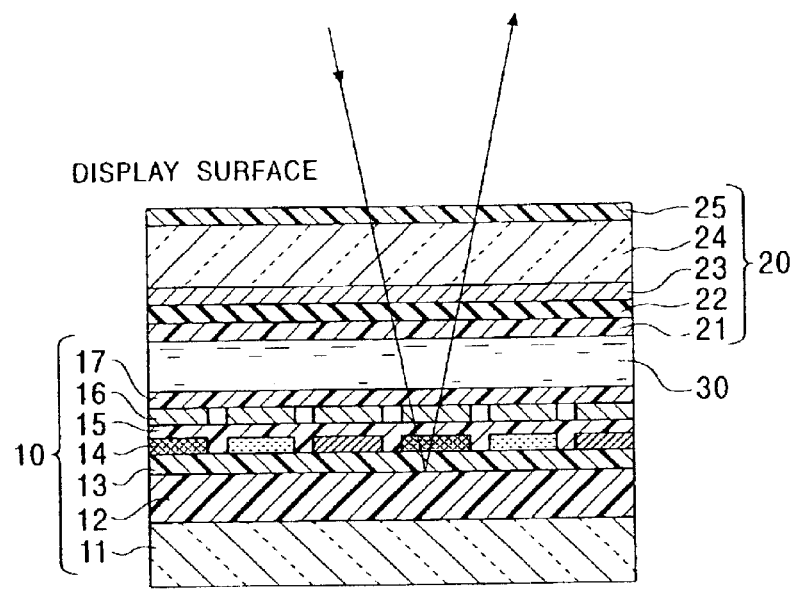
FIG. 8 is a sectional view showing an example of a typical reflective liquid crystal display.
Figure 9A:
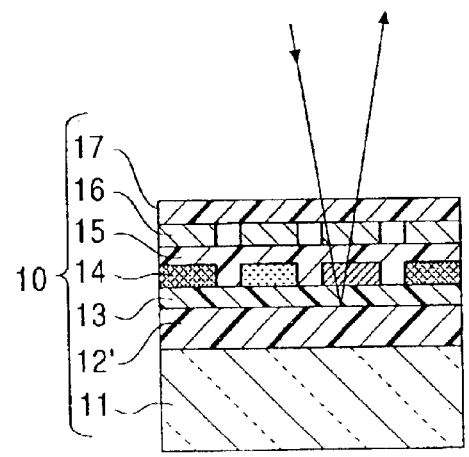
FIG. 9A is a sectional view of a reflector-side substrate of a specular-reflection type reflective liquid crystal display.
Figure 9B:
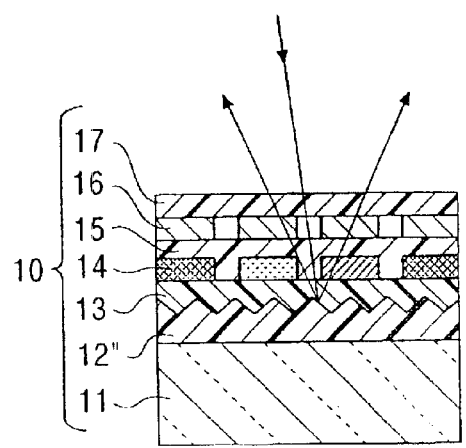
FIG. 9B is a sectional view of a reflector-side substrate of a diffuse-reflection type reflective liquid crystal display.
Figure 10:
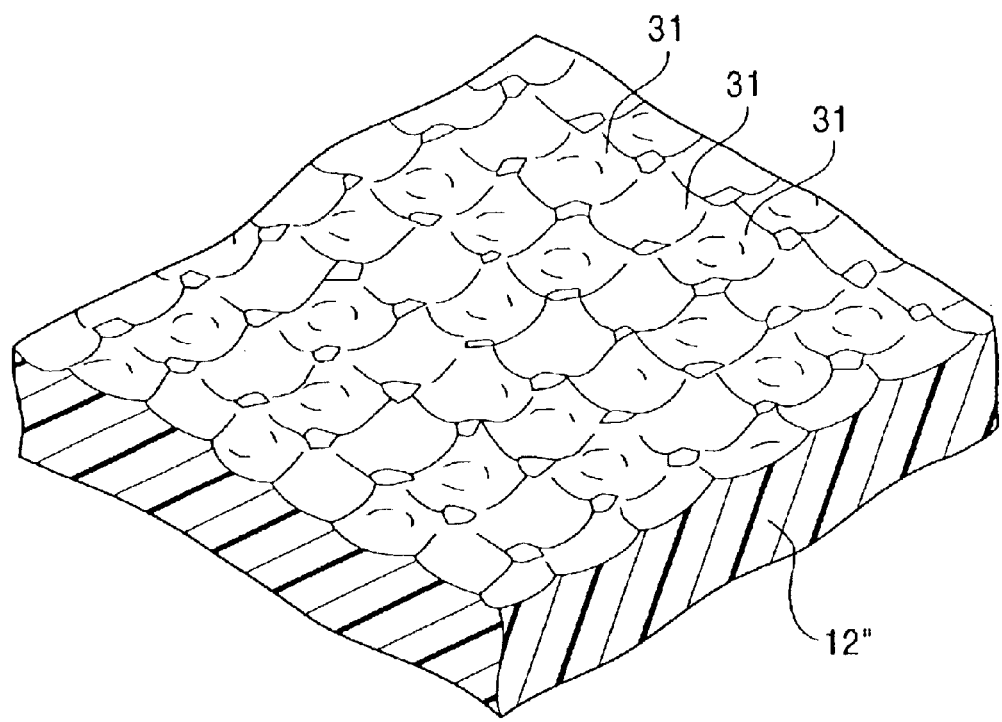
FIG. 10 is a perspective view showing a reflector of the known art.
Figure 11A:
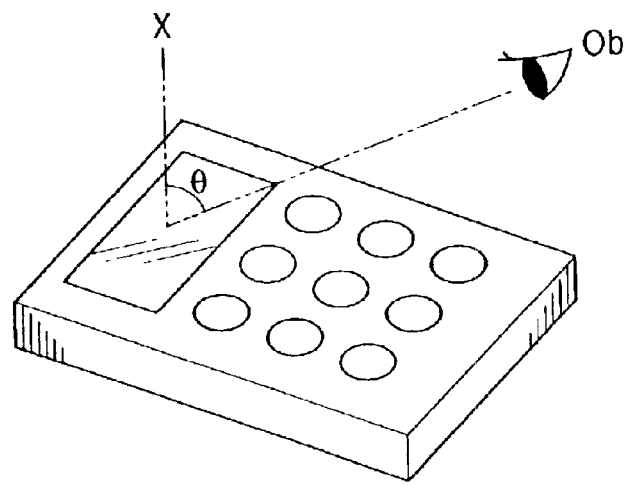
FIGS. 11A and 11B are perspective views showing a viewing angle, where
Figure 11B:
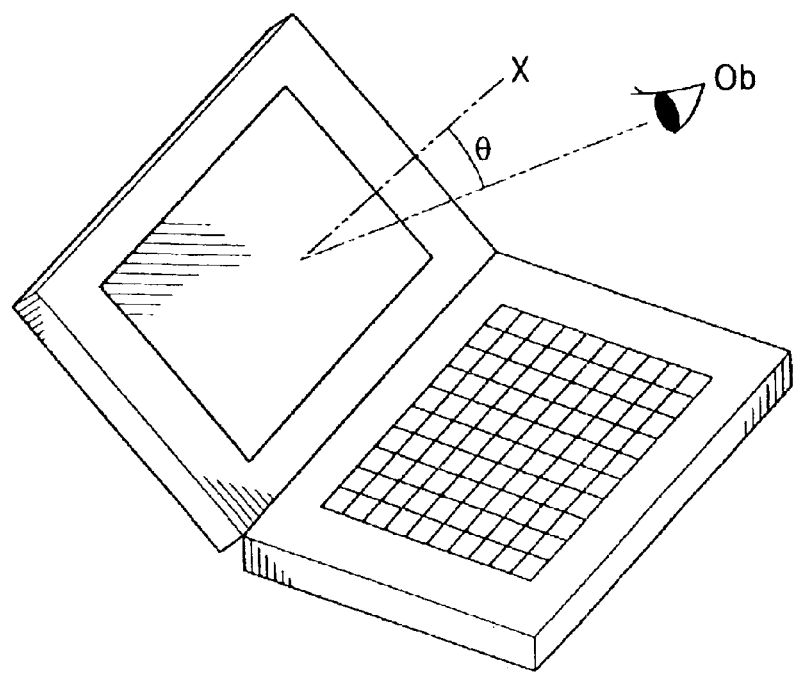

FIG. 7 is a diagram showing the manner in which the reflective liquid crystal display 100 is used. In FIG. 7, only the first curves A and the second curves B in the reflective liquid crystal display 100 are shown and other components are omitted for convenience.

The reflective liquid crystal display 100 is installed in a mobile phone, a notebook computer, personal data assistant, etc., in the orientation such that the x direction is aligned with the upward direction. In such a case, as shown in FIG. 7, the reflective liquid crystal display 100 is normally set or held at an angle relative to the horizontal plane such that the x direction is aligned with the upward direction. More specifically, when the reflective liquid crystal display 100 is used, it is disposed such that the first curves A are above the second curves B in each concave portion when viewed by the observer. In addition, the observer normally looks down onto the reflective liquid crystal display 100 from the upper side relative to the direction of specular reflection $K_0$ and from the lower side relative to the horizontal plane.

In such a case, external light (incident light J), which is primarily incident from the upper side, is mainly reflected by the surface at regions around the second curves B, so that reflection light K is not easily directed toward the lower side of the observer but rather heads mainly toward the upper side relative to the direction of specular reflection $K_0$.

Accordingly, the viewing area from which the observer normally views the display and the viewing area from which the display appears bright are made the same. Therefore, a display device which appears bright from the viewpoint of the observer can be obtained.

Although the reflective liquid crystal display according to the present embodiment shown in FIG. 6 is constructed such that the reflector 1 and the transparent electrode layer 16 are formed separately, the transparent electrode layer 16 may also be formed of the reflector 1 and placed at the position where the reflector 1 is formed in FIG. 6. In such a case, the transparent electrode layer also serves as a reflector, and the layer structure of the reflective liquid crystal display can be simplified.

Similarly, the reflector 1, is shown as formed from a single reflective material. In another embodiment, the reflector 1 may comprise a base portion onto which the concave portions were formed and a reflective layer disposed on the base layer. The base portion may be formed in a manner similar to that of the reflector 1, above, while the reflective layer may be formed by deposition, sputtering, evaporation or any other suitable method. The base portion may be any material suitable for forming the concave portions, organic or inorganic (for example glass), while the reflective layer may be, for example, a thin metallic layer. Alternately, the base portion may be the substrate itself.

In addition, the above-described reflector may be formed of a semi-transmissive, semi-reflective substrate such as a half mirror, etc., and an illumination plate may be disposed behind the liquid crystal panel. In such a case, a semi-transmissive, semi-reflective liquid crystal display can be obtained which serves as a reflective type when external light is bright and serves as a transmissive type by illuminating the illumination substrate when external light is dark. For this, the liquid crystal display may also include a light source disposed under or to one side of the display and additionally include a light guide to guide the light from the light source to at least the area under the reflector and display. The present invention may also be applied to such semi-transmissive, semi-reflective liquid crystal displays.

In addition, when a front light is disposed in front of the display-side substrate 20, a front-light liquid crystal display can be obtained in which external light is exclusively used when the external light is bright and the front light is optionally used when the external light is dark. The present invention may also be applied to such front-light liquid crystal displays.

The liquid-crystal driving method is not limited in the present invention, and the present invention may also be applied to active-matrix liquid crystal displays using thin film transistors and thin film diodes, segmented liquid crystal displays, etc., in addition to the above-described simple-matrix liquid crystal display.

What is claimed is:

1. A reflector comprising a substrate having a plurality of light-reflective concave portions on a surface thereof, each concave portion having a specific vertical section which passes through a deepest point of the concave portion,
   wherein an internal shape of the specific vertical section is defined by a first curve and a second curve, the first curve extending from a first point on a peripheral edge of the concave portion to the deepest point of the concave portion, and the second curve extending continuously from the first curve and from the deepest point of the concave portion to a second point on the peripheral edge of the concave portion, and
   wherein an average of an absolute value of an inclination angle of the first curve relative to the substrate surface is larger than an average of an absolute value of an inclination angle of the second curve relative to the substrate surface,
   a maximum value of the absolute value of the inclination angle of the first curve relative to the substrate surface is in the range of about 2° to 90°, and
   a maximum value of the absolute value of the inclination angle of the second curve relative to the substrate surface is less than that of the maximum value of the absolute value of the inclination angle of the first curve relative to the substrate surface.

2. A reflector according to claim 1, wherein the concave portions are formed such that the specific vertical sections of the concave portions are aligned in the same direction and orientations of the first curves of the concave portions are the same.

3. A reflector according to claim 1, wherein the inclination angle of the first curve relative to the substrate surface and the inclination angle of the second curve relative to the substrate surface are substantially zero at a point at which the first curve and the second curve are connected to each other.

4. A reflector according to claim 1, wherein a maximum value of the absolute value of the inclination angle of the first curve relative to the substrate surface is in the range of about 4° to 35°.

5. A reflector according to claim 1, wherein the concave portions are irregularly formed such that a depth thereof varies in the range of about 0.1 $\mu$m to 3 $\mu$m.

6. A reflector according to claim 1, wherein the concave portions are irregularly arranged next to each other.

7. A liquid crystal display comprising a reflector according to claim 1.

8. A liquid crystal display according to claim 7, wherein the concave portions are formed such that the specific vertical sections of each concave portion are aligned in the same direction and orientations of the first curves in the concave portions are the same, and the reflector is installed such that the first curves are disposed above the second curves in the concave portions when viewed by an observer.

9. A reflector in which an integrated value of reflectance in a reflection-angle range smaller than a specular reflection angle with respect to a substrate surface is different from an integrated value of reflectance in a reflection-angle range larger than the specular reflection angle, wherein the reflection-angle range corresponding to the larger of the integrated values of reflectance is from about normal to the surface to about 35° from normal to the surface.

10. A liquid crystal display comprising a reflector according to claim 9, wherein the reflector is installed such that the reflection-angle range corresponding to the larger of the integrated values of reflectance is disposed at the upper side of the specular reflection angle with respect to the substrate surface when viewed by an observer.

11. A liquid crystal display comprising a reflector according to claim 9, wherein a peak of brightness of the liquid crystal display is approximately 20° from normal to the surface.

12. A liquid crystal display comprising a reflector according to claim 9, wherein the reflection-angle range corresponding to the larger of the integrated values of reflectance is more proximate to a normal of the substrate surface than the specular reflection angle.

13. A reflector comprising a reflective surface in which incident light is diffusely reflected and is preferentially reflected over a range of angles smaller than that of a specular reflection angle of the incident light with respect to a normal of a surface of the reflector and back reflection is suppressed over a wide viewing-angle range, wherein the range of angles is from about normal to the surface to about 35° from normal to the surface.

14. A reflector according to claim 13, wherein a peak of brightness of the liquid crystal display is approximately 20° from normal to the surface.

15. A reflector according to claim 13, wherein the reflective surface comprises a plurality of light-reflective concave portions having an internal shape with a cross-section defined by a first curve and a second curve, the first curve extending from a first point on a peripheral edge of the concave portion to a deepest point of the concave portion, and the second curve extending continuously from the first curve and from the deepest point of the concave portion to a second point on the peripheral edge of the concave portion, and wherein an average of an absolute value of an inclination angle of the first curve relative to a surface of the reflector is larger than an average of an absolute value of an inclination angle of the second curve relative to the reflector surface.

16. A reflector according to claim 15, wherein the concave portions are aligned in the same direction and orientations of the first curves of the concave portions are the same.

17. A reflector according to claim 15, wherein the inclination angle of the first curve and the inclination angle of the second curve are substantially zero at a point at which the first curve and the second curve are connected to each other.

18. A reflector according to claim 15, wherein a maximum value of the absolute value of the inclination angle of the first curve is in the range of about 2° to 90°.

19. A reflector according to claim 15, wherein a maximum value of the absolute value of the inclination angle of the first curve is in the range of about 4° to 35°.

20. A reflector according to claim 18, wherein the maximum value of the absolute value of the inclination angle of the first curve in a majority of the concave portions is in the range of about 4° to 35°.

21. A reflector according to claim 18, wherein a maximum value of the absolute value of the inclination angle of the second curve is less than that of the maximum value of the absolute value of the inclination angle of the first curve.

22. A reflector according to claim 19, wherein a maximum value of the absolute value of the inclination angle of the second curve is less than that of the maximum value of the absolute value of the inclination angle of the first curve.

23. A reflector according to claim 20, wherein a maximum value of the absolute value of the inclination angle of the second curve is less than that of the maximum value of the absolute value of the inclination angle of the first curve.

24. A reflector according to claim 15, wherein the concave portions are irregularly formed such that a depth thereof varies in the range of about 0.1 $\mu$m to 3 $\mu$m.

25. A reflector according to claim 15, wherein the concave portions are irregularly arranged next to each other.

26. A liquid crystal display comprising a reflector according to claim 15.

27. A liquid crystal display according to claim 26, wherein the concave portions are aligned in the same direction and orientations of the first curves in the concave portions are the same, and the reflector is installed such that the first curves are disposed above the second curves in the concave portions when viewed by an observer.

28. A liquid crystal display comprising a reflector according to claim 13.

29. A liquid crystal display comprising:
a reflector comprising a substrate having a plurality of light-reflective concave portions on a surface thereof, each concave portion having a specific vertical section which passes through a deepest point of the concave portion,
wherein an internal shape of the specific vertical section is defined by a first curve and a second curve, the first curve extending from a first point on a peripheral edge of the concave portion to the deepest point of the concave portion, and the second curve extending continuously from the first curve and from the deepest point of the concave portion to a second point on the peripheral edge of the concave portion, and
an average of an absolute value of an inclination angle of the first curve relative to the substrate surface is larger than an average of an absolute value of an inclination angle of the second curve relative to the substrate surface, and
the concave portions are formed such that the specific vertical sections of each concave portion are aligned in the same direction and orientations of the first curves in the concave portions are the same, and the reflector is installed such that the first curves are disposed above the second curves in the concave portions when viewed by an observer.

30. A liquid crystal display according to claim 29, wherein the inclination angle of the first curve relative to the substrate surface and the inclination angle of the second curve relative to the substrate surface are substantially zero at a point at which the first curve and the second curve are connected to each other.

31. A liquid crystal display according to claim 29, wherein a maximum value of the absolute value of the inclination angle of the first curve relative to the substrate surface is in the range of about 2° to 90°.

32. A liquid crystal display according to claim 29, wherein a maximum value of the absolute value of the inclination angle of the first curve relative to the substrate surface is in the range of about 4° to 35°.

33. A liquid crystal display according to claim 29, wherein the maximum value of the absolute value of the inclination angle of the first curve relative to the substrate surface in a majority of the concave portions is in the range of about 4° to 35°.

34. A liquid crystal display according to claim 33, wherein a maximum value of the absolute value of the inclination angle of the second curve relative to the substrate surface is less than that of the maximum value of the absolute value of the inclination angle of the first curve relative to the substrate surface.

35. A liquid crystal display according to claim 32, wherein a maximum value of the absolute value of the inclination angle of the second curve relative to the substrate surface is less than that of the maximum value of the absolute value of the inclination angle of the first curve relative to the substrate surface.

36. A liquid crystal display according to claim 29, wherein the concave portions are irregularly formed such that a depth thereof varies in the range of about 0.1 μm to 3 μm.

37. A liquid crystal display according to claim 29, wherein the concave portions are irregularly arranged next to each other.

38. A reflector in which an integrated value of reflectance in a reflection-angle range smaller than a specular reflection angle with respect to a substrate surface is different from an integrated value of reflectance in a reflection-angle range larger than the specular reflection angle, wherein a peak of brightness of the liquid crystal display is approximately 20° from normal to the surface.

39. A liquid crystal display comprising a reflector according to claim 38, wherein the reflector is installed such that the reflection-angle range corresponding to the larger of the integrated values of reflectance is disposed at the upper side of the specular reflection angle with respect to the substrate surface when viewed by an observer.

40. A liquid crystal display comprising a reflector according to claim 38, wherein the reflection-angle range corresponding to the larger of the integrated values of reflectance is more proximate to a normal of the substrate surface than the specular reflection angle.

41. A reflector in which an integrated value of reflectance in a reflection-angle range smaller than a specular reflection angle with respect to a substrate surface is different from an integrated value of reflectance in a reflection-angle range larger than the specular reflection angle, wherein the reflection-angle range corresponding to the larger of the integrated values of reflectance is more proximate to a normal of the substrate surface than the specular reflection angle.

42. A liquid crystal display comprising a reflector according to claim 41, wherein the reflector is installed such that the reflection-angle range corresponding to the larger of the integrated values of reflectance is disposed at the upper side of the specular reflection angle with respect to the substrate surface when viewed by an observer.

43. A liquid crystal display comprising a reflector according to claim 41.

44. A reflector comprising a reflective surface in which incident light is diffusely reflected and is preferentially reflected over a range of angles smaller than that of a specular reflection angle of the incident light with respect to a normal of a surface of the reflector and back reflection is suppressed over a wide viewing-angle range, wherein a peak of brightness of the liquid crystal display is approximately 20° from normal to the surface.

45. A reflector according to claim 44, wherein the reflective surface comprises a plurality of light-reflective concave portions having an internal shape with a cross-section defined by a first curve and a second curve, the first curve extending from a first point on a peripheral edge of the concave portion to a deepest point of the concave portion, and the second curve extending continuously from the first curve and from the deepest point of the concave portion to a second point on the peripheral edge of the concave portion, and wherein an average of an absolute value of an inclination angle of the first curve relative to a surface of the reflector is larger than an average of an absolute value of an inclination angle of the second curve relative to the reflector surface.

46. A reflector according to claim 45, wherein the concave portions are aligned in the same direction and orientations of the first curves of the concave portions are the same.

47. A reflector according to claim 45, wherein the inclination angle of the first curve and the inclination angle of the second curve are substantially zero at a point at which the first curve and the second curve are connected to each other.

48. A reflector according to claim 45, wherein a maximum value of the absolute value of the inclination angle of the first curve is in the range of about 2° to 90°.

49. A reflector according to claim 45, wherein a maximum value of the absolute value of the inclination angle of the first curve is in the range of about 4° to 35°.

50. A reflector according to claim 48, wherein the maximum value of the absolute value of the inclination angle of the first curve in a majority of the concave portions is in the range of about 4° to 35°.

51. A reflector according to claim 48, wherein a maximum value of the absolute value of the inclination angle of the second curve is less than that of the maximum value of the absolute value of the inclination angle of the first curve.

52. A reflector according to claim 49, wherein a maximum value of the absolute value of the inclination angle of the second curve is less than that of the maximum value of the absolute value of the inclination angle of the first curve.

53. A reflector according to claim 50, wherein a maximum value of the absolute value of the inclination angle of the second curve is less than that of the maximum value of the absolute value of the inclination angle of the first curve.

54. A reflector according to claim 45, wherein the concave portions are irregularly formed such that a depth thereof varies in the range of about 0.1 μm to 3 μm.

55. A reflector according to claim 45, wherein the concave portions are irregularly arranged next to each other.

56. A liquid crystal display comprising a reflector according to claim 45.

57. A liquid crystal display according to claim 56, wherein the concave portions are aligned in the same direction and orientations of the first curves in the concave portions are the same, and the reflector is installed such that the first curves are disposed above the second curves in the concave portions when viewed by an observer.

58. A liquid crystal display comprising a reflector according to claim 45.

59. A reflector comprising a reflective surface in which incident light is diffusely reflected and is preferentially reflected over a range of angles smaller than that of a specular reflection angle of the incident light with respect to a normal of a surface of the reflector and back reflection is suppressed over a wide viewing-angle range, wherein the reflective surface comprises a plurality of light-reflective concave portions having an internal shape with a cross-section defined by a first curve and a second curve, the first curve extending from a first point on a peripheral edge of the concave portion to a deepest point of the concave portion, and the second curve extending continuously from the first curve and from the deepest point of the concave portion to a second point on the peripheral edge of the concave portion, and wherein an average of an absolute value of an inclination angle of the first curve relative to a surface of the reflector is larger than an average of an absolute value of an inclination angle of the second curve relative to the reflector surface.

60. A reflector according to claim 59, wherein the concave portions are aligned in the same direction and orientations of the first curves of the concave portions are the same.

61. A reflector according to claim 59, wherein the inclination angle of the first curve and the inclination angle of the second curve are substantially zero at a point at which the first curve and the second curve are connected to each other.

62. A reflector according to claim 59, wherein a maximum value of the absolute value of the inclination angle of the first curve is in the range of about 2° to 90°.

63. A reflector according to claim 59, wherein a maximum value of the absolute value of the inclination angle of the first curve is in the range of about 4° to 35°.

64. A reflector according to claim 63, wherein the maximum value of the absolute value of the inclination angle of the first curve in a majority of the concave portions is in the range of about 4° to 35°.

65. A reflector according to claim 63, wherein a maximum value of the absolute value of the inclination angle of the second curve is less than that of the maximum value of the absolute value of the inclination angle of the first curve.

66. A reflector according to claim 64, wherein a maximum value of the absolute value of the inclination angle of the second curve is less than that of the maximum value of the absolute value of the inclination angle of the first curve.

67. A reflector according to claim 65, wherein a maximum value of the absolute value of the inclination angle of the second curve is less than that of the maximum value of the absolute value of the inclination angle of the first curve.

68. A reflector according to claim 59, wherein the concave portions are irregularly formed such that a depth thereof varies in the range of about 0.1 $\mu$m to 3 $\mu$m.

69. A reflector according to claim 59, wherein the concave portions are irregularly arranged next to each other.

70. A liquid crystal display comprising a reflector according to claim 59.

71. A liquid crystal display according to claim 70, wherein the concave portions are aligned in the same direction and orientations of the first curves in the concave portions are the same, and the reflector is installed such that the first curves are disposed above the second curves in the concave portions when viewed by an observer.

* * * * *